US012170178B2

(12) United States Patent
Das et al.

(10) Patent No.: US 12,170,178 B2
(45) Date of Patent: Dec. 17, 2024

(54) DUAL CONDUCTOR THOMSON COIL FOR FASTER OPENING OF A HYBRID CIRCUIT BREAKER

(71) Applicant: EATON INTELLIGENT POWER LIMITED, Dublin (IE)

(72) Inventors: Asish Das, Kendrapara (IN); Santhosh Kumar Chamarajanagar Govinda Nayaka, Moon Township, PA (US); Robert Michael Slepian, Murrysville, PA (US); Xin Zhou, Wexford, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 139 days.

(21) Appl. No.: 17/975,751

(22) Filed: Oct. 28, 2022

(65) Prior Publication Data

US 2024/0145186 A1 May 2, 2024

(51) Int. Cl.

| | |
|---|---|
| ***H01H 3/54*** | (2006.01) |
| ***H01F 7/06*** | (2006.01) |
| ***H01H 3/22*** | (2006.01) |
| ***H01H 33/28*** | (2006.01) |

(52) U.S. Cl.

CPC ............... *H01H 3/222* (2013.01); *H01F 7/06* (2013.01); *H01H 3/54* (2013.01); *H01H 33/285* (2013.01)

(58) Field of Classification Search

CPC ........ H01H 3/222; H01H 3/54; H01H 33/285; H01H 9/541; H01H 33/6662; H01H 3/28; H01H 33/38; H01F 7/06; H01F 7/1607

USPC .............................................................. 335/2

See application file for complete search history.

(56) References Cited

U.S. PATENT DOCUMENTS

| | | | |
|---|---|---|---|
| 10,580,599 | B1 | 3/2020 | Wang et al. |
| 11,152,174 | B2 | 10/2021 | Leccia et al. |
| 11,183,348 | B1 | 11/2021 | Leccia et al. |
| 11,348,751 | B2 | 5/2022 | Wang et al. |

(Continued)

FOREIGN PATENT DOCUMENTS

| | | |
|---|---|---|
| KR | 101 741 460 B1 | 5/2017 |
| WO | 2014/048483 A1 | 4/2014 |

OTHER PUBLICATIONS

European Patent Office "International Search Report and Written Opinion" for corresponding International (PCT) Appl. No. PCT/EP2023/025451, dated Feb. 5, 2024, 14 pp.

*Primary Examiner* — Shawki S Ismail
*Assistant Examiner* — Lisa N Homza
(74) *Attorney, Agent, or Firm* — Eckert Seamans Cherin & Mellott, LLC

(57) ABSTRACT

A dual conductor Thomson coil actuator for use in opening the separable contacts of a circuit interrupter comprises two nested conductors wound to form a single coil, rather than the traditional design comprising one single conductor wound to form a coil of the same size. Each of the two conductors can be excited by half the capacitance that would be used to excite the traditional single conductor coil, using the same voltage as the single conductor coil. When the same total capacitor-stored energy that would be used to excite the single conductor coil is instead used to excite the dual conductor coil, the initial pulse of aggregate current through the dual conductor coil is greater than the initial pulse of current through the single conductor coil, resulting in a faster initial opening distance of the separable contacts during an opening stroke.

18 Claims, 6 Drawing Sheets

(56) References Cited

U.S. PATENT DOCUMENTS

| | | | | |
|---|---|---|---|---|
| 2006/0256470 | A1* | 11/2006 | Juds | H01H 33/38 360/123.57 |
| 2020/0411261 | A1* | 12/2020 | Zhou | H01H 33/59 |
| 2022/0068532 | A1* | 3/2022 | Ashtekar | H01F 7/08 |
| 2022/0139654 | A1 | 5/2022 | Holp et al. | |
| 2022/0270839 | A1 | 8/2022 | Gottschalk et al. | |
| 2022/0344115 | A1* | 10/2022 | Das | H01H 1/66 |
| 2023/0020292 | A1* | 1/2023 | Ashtekar | H01F 7/064 |
| 2023/0283064 | A1* | 9/2023 | Chen | H02H 3/033 |
| 2024/0212957 | A1* | 6/2024 | Muniyappan | H01H 33/6661 |

* cited by examiner

DUAL CONDUCTOR THOMSON COIL FOR FASTER OPENING OF A HYBRID CIRCUIT BREAKER

FIELD OF THE INVENTION

The disclosed concept relates generally to circuit interrupters, and in particular, to mechanisms for opening separable contacts of circuit interrupters at high speeds.

BACKGROUND OF THE INVENTION

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit interrupters typically include mechanically operated separable electrical contacts, which operate as a switch. When the separable contacts are in contact with one another in a closed state, current is able to flow through any circuits connected to the circuit interrupter. When the separable contacts are not in contact with one another in an open state, current is prevented from flowing through any circuits connected to the circuit interrupter. The separable contacts may be operated either manually by way of an operator handle, remotely by way of an electrical signal, or automatically in response to a detected fault condition. Typically, such circuit interrupters include an actuator designed to rapidly close or open the separable contacts, and a trip mechanism, such as a trip unit, which senses a number of fault conditions to trip the separable contacts open automatically using the actuator. Upon sensing a fault condition, the trip unit trips the actuator to move the separable contacts to their open position.

Hybrid circuit interrupters employ a power electronic interrupter in addition to the mechanical separable contacts, which are often components of a vacuum switch. The electronic interrupter comprises electronics structured to commutate current after a fault is detected. Once current is commutated from the mechanical vacuum switch to the electronic interrupter, the mechanical separable contacts are able to separate with a reduced risk of arcing. It is advantageous to open the mechanical separable contacts at fast speeds in order to limit the let-through current and commutate as much current as possible to the electronic branch as quickly as possible.

Thomson coil actuators are noted for their ability to open mechanical separable contacts very high speeds, and are often employed in hybrid circuit interrupters. However, because it is preferable to minimize the time that it takes to separate the mechanical separable contacts, there is always room for improvement in increasing the speed at which an actuator opens mechanical separable contacts in order to minimize the time that elapses between detection of a fault condition and interruption of a fault current. Because the elapse of any time between the occurrence of a fault condition and the opening of the mechanical separable contacts leads to at least some let-through current passing through the mechanical separable contacts, there is always a need for actuators that can open mechanical separable contacts at higher speeds than available actuators can.

There is thus room for improvement within actuators used to open mechanical separable contacts of hybrid circuit interrupters.

SUMMARY OF THE INVENTION

These needs, and others, are met by a dual conductor Thomson coil actuator that comprises two nested conductors wound to form a single coil, rather than one single conductor wound to form a coil of the same size. Each of the two nested coils is structured to be excited by a capacitor bank with half the capacitance of a capacitor bank that would be used to excite the single larger coil, with the two capacitor banks used to charge the dual conductor coil being charged to the same voltage as the one capacitor bank used to excite the single conductor coil. Thus, when the same charging voltage that would be used to charge the capacitor bank for the single larger coil is used to instead charge the two capacitor banks for the two nested conductors of the dual conductor coil, the initial pulse of aggregate current through the dual conductor coil is greater than the initial pulse of current through the single conductor coil, which results in the aggregate magnetic force exerted by the two nested conductors of the dual conductor coil being greater than the magnetic force that would be exerted by the single conductor coil.

In accordance with one aspect of the disclosed concept, an actuator for use with a circuit interrupter comprises: a conductive plate structured to be coupled to a drive assembly of the circuit interrupter, and a conductive coil. The coil comprises: a plurality of turns, a first conductor wound into a first number of turns, a second conductor wound into a second number of turns, a first power source electrically connected to the first conductor, a second power source electrically connected to the second conductor, and an opening structured to receive the drive assembly and to enable the drive assembly to move freely during an opening stroke. The plurality of turns is the sum of the first number of turns and the second number of turns, and the first conductor and the second conductor are nested such that the first number of turns forms alternating turns of the coil relative to the second number of turns. The first power source and the second power source are configured to simultaneously supply a first time-varying current signal and a second time-varying current signal, respectively, to the first conductor and the second conductor. The actuator is structured to cause the coil to repel the conductive plate when the first and second time-varying current signals are supplied to the first and second conductors.

In accordance with another aspect of the disclosed concept, a hybrid circuit interrupter comprises: a line conductor structured to connect a load to a power source; a hybrid switch assembly disposed between the power source and the load, the hybrid switch assembly comprising a fixed mechanical separable contact and a movable mechanical separable contact and an electronic interrupter, the movable separable contact being structured to move between a closed state and an open state, the electronic interrupter being structured to commutate current when a fault is detected on the line conductor; a drive assembly operably coupled to the movable separable contact; an electronic trip unit structured to monitor the line conductor for fault conditions; and an actuator structured to open and close the movable separable contact. The actuator comprises a conductive plate coupled to the drive assembly, and a conductive coil. The coil comprises: a plurality of turns, a first conductor wound into a first number of turns, a second conductor wound into a second number of turns, a first power source electrically connected to the first conductor, a second power source electrically connected to the second conductor, and an opening structured to receive the drive assembly and to enable the drive assembly to move freely during an opening stroke. The plurality of turns is the sum of the first number of turns and the second number of turns. The first conductor and the second conductor are nested such that the first number of turns forms alternating turns of the coil relative to the second number of turns. The first power source and second power source are configured to simultaneously supply a first time-varying current signal and a second time-varying current signal, respectively, to the first conductor and the second conductor, and the actuator is structured to cause the coil to repel the conductive plate when the first and second time-varying current signals are supplied to the first and second conductors.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
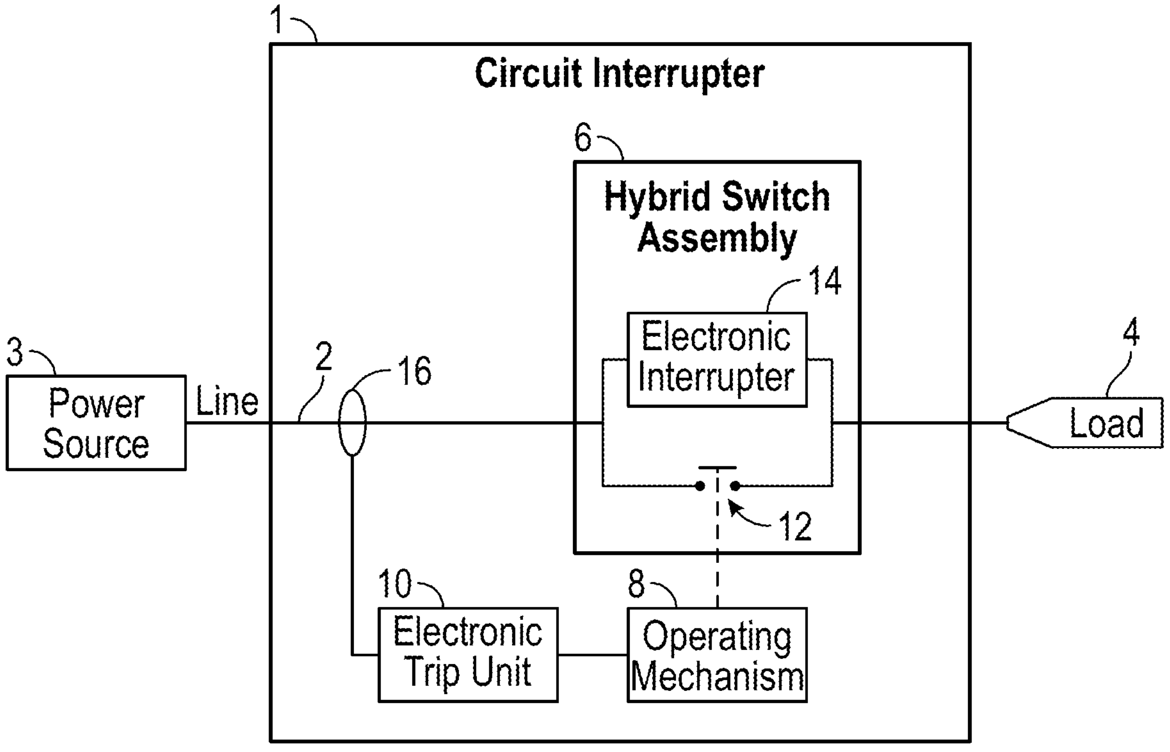
FIG. 1 is a schematic diagram of hybrid circuit interrupter, in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As used herein, the singular form of "a", "an", and "the" include plural references unless the context clearly dictates otherwise.

As employed herein, the statement that two or more parts are "coupled" together shall mean that the parts are joined together either directly or joined through one or more intermediate parts.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

As employed herein, the term "processing unit" or "processor" shall mean a programmable analog and/or digital device that can store, retrieve, and process data; a microprocessor; a microcontroller; a microcomputer; a central processing unit; or any suitable processing device or apparatus.

FIG. 1 is a schematic diagram of a hybrid circuit interrupter 1 (e.g., without limitation, a circuit breaker), in accordance with an example embodiment of the disclosed concept. The circuit interrupter 1 includes a line conductor 2 structured to electrically connect a power source 3 to a load 4. The circuit interrupter 1 is structured to trip open to interrupt current flowing between the power source 3 and load 4 in the event of a fault condition (e.g., without limitation, an overcurrent condition) in order to protect the load 4, circuitry associated with the load 4, as well as the power source 3.

The circuit interrupter 1 further includes a hybrid switch assembly 6, an operating mechanism 8, and an electronic trip unit 10. The hybrid switch assembly 6 in FIG. 1 is a simplified depiction of a hybrid switch intended to demonstrate how current commutates past mechanical separable contacts 12 in a hybrid switch, and is not intended to be limiting on the different types of hybrid switch assemblies that can be included in a hybrid circuit interrupter 1. The hybrid switch assembly 6 comprises a set of mechanical separable contacts 12 and an electronic interrupter 14. The electronic trip unit 10 is structured to monitor power flowing through the circuit interrupter 1 via a current sensor 16 and/or other sensors and to detect fault conditions based on the power flowing through the circuit interrupter 1.

Under normal operating conditions, the mechanical contacts 12 are in a closed state such that they are in contact with one another, enabling current to flow through the line conductor 2 and the mechanical contacts 12 to the load 4. In addition, the electronic interrupter 14 is powered off under normal operating conditions, such that current cannot flow through the electronic interrupter 14. In response to detecting a fault condition, the electronic trip unit 10 is configured to output a first signal to the electronic interrupter 14, in order to power on the electronic interrupter 14, and to output a second signal to the operating mechanism 8, to initiate actuation of the operating mechanism 8 in order to open the mechanical contacts 12. Powering on the electronic interrupter 14 with the first signal enables the electronic interrupter 14 to commutate fault current from the mechanical contacts 12 to the electronic interrupter 14. The transmission of the second signal from the trip unit 10 to the operating mechanism 8 is timed to ensure that the operating mechanism 8 does not open the mechanical contacts 12 until after the current has been commutated to the electronic interrupter 14, in order to minimize let-through current and the effects of arcing.

Figure 2A:
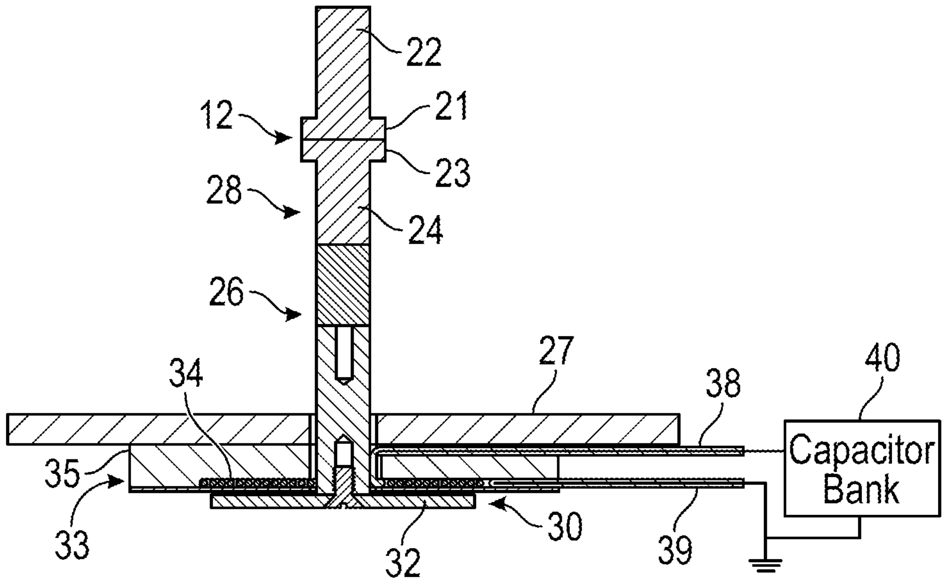
FIG. 2A (Prior Art)
FIG. 2A is a sectional view of a set of mechanical separable contacts in a closed state and a prior art single conductor Thomson coil actuator that can be used as the mechanical separable contacts and operating mechanism schematically depicted in FIG. 1.
Figure 2B:
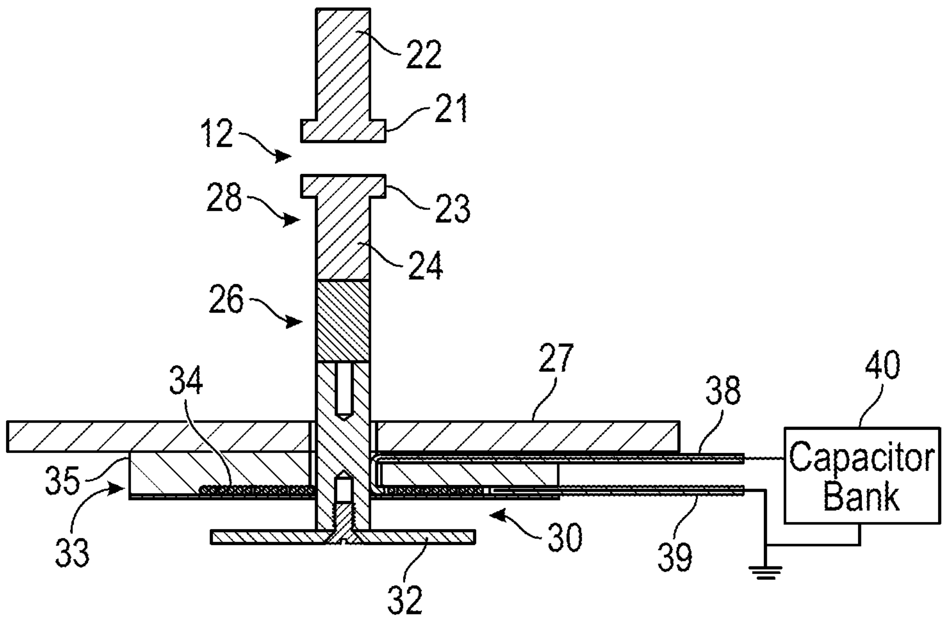
FIG. 2B (Prior Art)
FIG. 2B shows the mechanical separable contacts and prior art Thomson coil actuator shown in FIG. 2A after the mechanical separable contacts have separated to an open state during an opening operation.

Referring now to FIGS. 2A and 2B, a portion of a prior art circuit interrupter is shown, with the portion shown corresponding to the mechanical separable contacts 12 and part of the operating mechanism 8 depicted in FIG. 1. FIG. 2A depicts the mechanical contacts 12 in a closed state, and FIG. 2B depicts the mechanical contacts 12 in an open state after an opening stroke has occurred, as occurs after the trip unit 10 detects a fault condition and actuates the operating mechanism 8 to open the mechanical contacts 12. The mechanical contacts 12 comprise both a stationary contact 21 disposed at the end of a stationary conductor 22, and a movable contact 23 disposed at the end of a movable conductor 24. The movable conductor 24 is coupled to a drive shaft 26 disposed through an opening in a flange 27. The composite structure comprising the movable conductor 24 and the drive shaft 26 can be referred to as the drive assembly 28. The drive assembly 28 is operably coupled to a Thomson coil actuator 30, which forms part of the operating mechanism 8 shown in FIG. 1. The Thomson coil actuator 30 comprises a conductive plate 32 coupled to the end of the drive shaft 26, and a coil arrangement 33.

Figure 3:
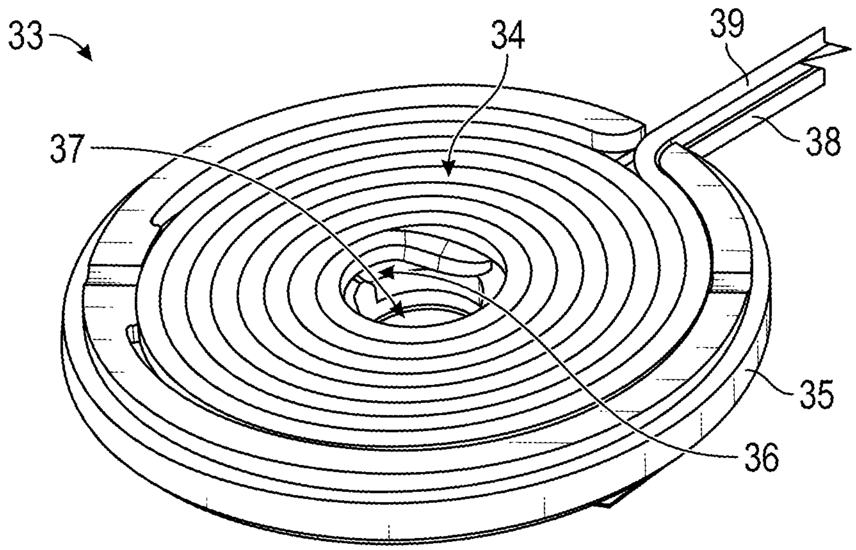
FIG. 3 (Prior Art)
FIG. 3 is a perspective view of the single conductor Thomson coil arrangement shown in FIGS. 2A and 2B.

Referring now to FIG. 3 in conjunction with FIGS. 2A-2B, the coil arrangement 33 comprises a conductive coil 34 seated within a coil housing 35. The coil arrangement 33 is structured to remain fixed in place, and stationary positioning of the coil arrangement 33 can be achieved, for example and without limitation, by fixedly coupling the coil housing 35 to a structural support element such as the flange 27. The coil 34 comprises an opening 36 and the coil housing 35 comprises an opening 37, with the coil 34 and housing 35 structured such that the openings 36 and 37 align when the coil 34 is seated within the housing 35. The openings 36 and 37 are structured to receive the drive shaft 26 and enable the drive assembly 28 to move freely during an opening stroke.

The coil 34 comprises a first lead 38 and a second lead 39 that are used to electrically connect the coil 34 to a power source, such as a capacitor bank 40. The capacitor bank 40 is kept fully charged, and when the mechanical contacts 12 are closed and a fault condition is detected, the signal transmitted by the trip unit 10 to the operating mechanism 8 causes the capacitor bank 40 to discharge so that a time-varying current is supplied to the coil 34 via the first lead 38, generating a magnetic field. The magnetic field repels the conductive plate 32 away from the coil 34, causing the drive shaft 26 and movable conductor 24 to separate the movable contact 23 from the stationary contact 21.

Figure 4:
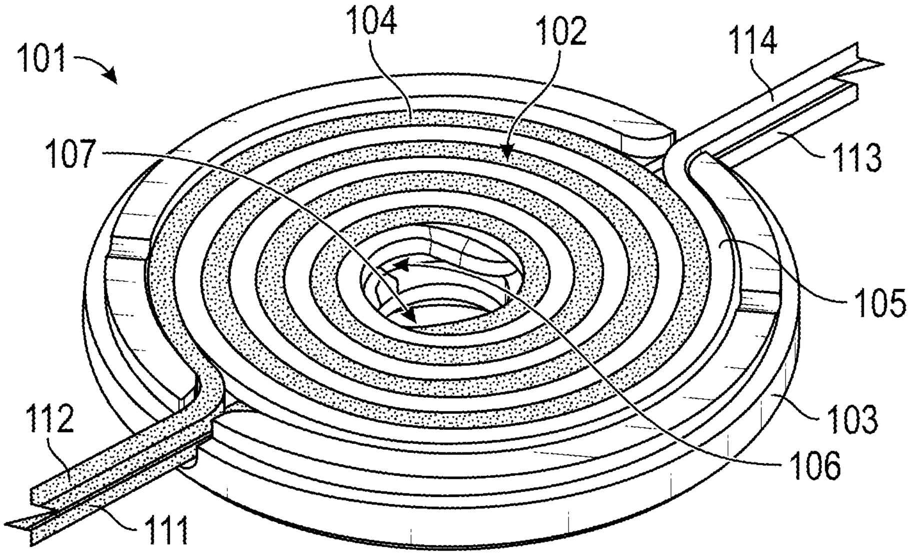
FIG. 4 is a perspective view of an improved dual conductor Thomson coil arrangement, in accordance with an example embodiment of the disclosed concept.
Figure 5A:
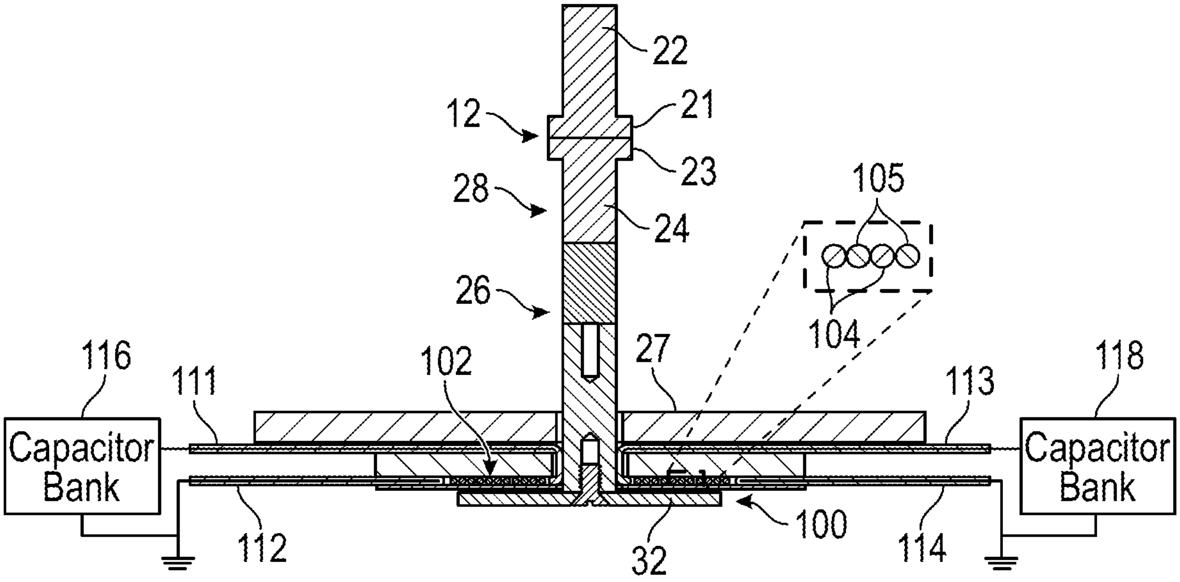
FIG. 5A is a sectional view of a set of mechanical separable contacts in a closed state and the dual conductor Thomson coil actuator shown in FIG. 4, which can be used as the mechanical separable contacts and operating mechanism schematically depicted in FIG. 1, in accordance with an example embodiment of the disclosed concept.
Figure 5B:
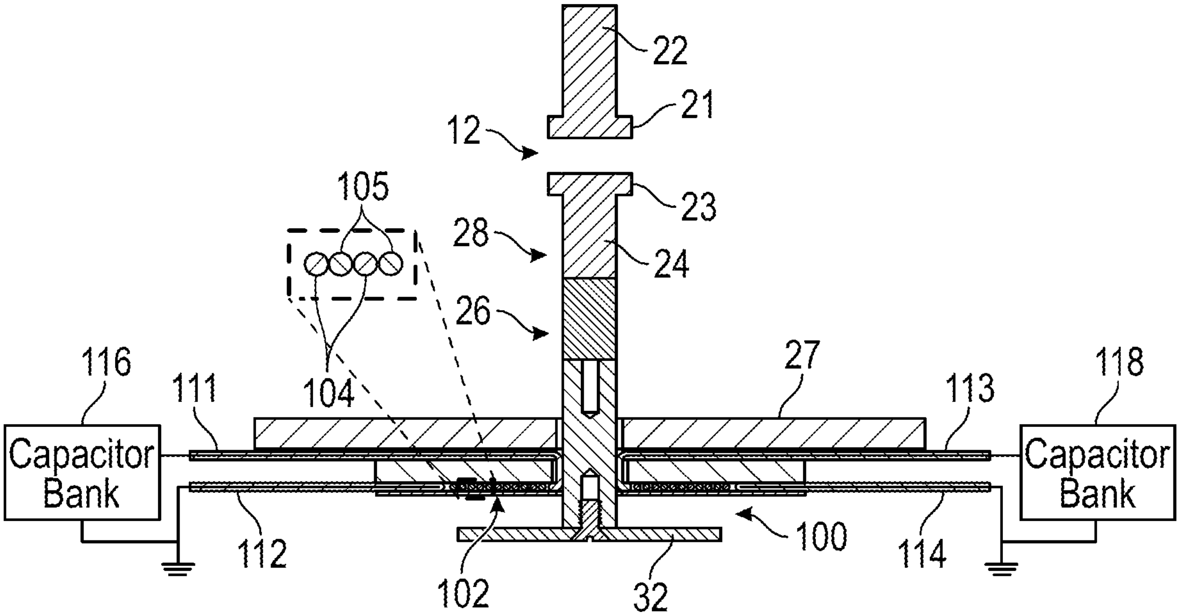
FIG. 5B shows the mechanical separable contacts and dual conductor Thomson coil actuator shown in FIG. 5A after the mechanical separable contacts have separated to an open state during an opening operation, in accordance with an example embodiment of the disclosed concept.

The prior art coil 34 shown in FIG. 3 comprises a single conductor wound into a coil, as known Thomson coil actuators use. Referring now to FIG. 4 and FIGS. 5A-5B, a Thomson coil actuator 100 comprising the conductive plate 32 and an improved coil arrangement 101 according to exemplary embodiments of the disclosed concept is shown. It is noted that FIG. 5A depicts the mechanical contacts 12 in a closed state similarly to FIG. 2A, and that FIG. 5B depicts the mechanical contacts 12 in an open state after an opening stroke has occurred, similarly to FIG. 2B. As shown in FIG. 4, the coil arrangement 101 comprises a dual conductor conductive coil 102 and a housing 103. In contrast with the single conductor configuration of the prior art coil 34, the disclosed improved Thomson coil arrangement 101 uses two separate conductors 104 and 105 interwound to form the coil 102. As shown in FIG. 4, the two conductors 104 and 105 are nested relative to one another such that each conductor 104, 105 forms alternating turns of the coil 102. The coil 102 comprises an opening 106 and the coil housing 103 comprises an opening 107, with the coil 102 and housing 103 structured such that the openings 106 and 107 align when the coil 102 is seated within the housing 103. As shown in FIGS. 5A-5B, the openings 106 and 107 are structured to receive the drive shaft 26 and enable the drive assembly 28 to move freely during an opening stroke.

The first conductor 104 comprises a first lead 111 and a second lead 112, and the second conductor 105 comprises a first lead 113 and a second lead 114, with the leads being used to electrically connect each conductor 104, 105 to a power source, such as a capacitor bank. As shown in FIGS. 5A and 5B, in exemplary embodiments of the disclosed concept, the Thomson coil actuator 100 comprises a separate dedicated capacitor bank for each conductor 104 and 105 such that the first conductor 104 is powered by a first capacitor bank 116 and the second conductor 105 is powered by a second capacitor bank 118 (in FIGS. 5A-5B, the first lead 111 of the first conductor 104 is labeled and shown connected to the capacitor bank 116, and the first lead 113 of the second conductor 105 is labeled and shown connected to the capacitor bank 118). Similarly to the capacitor bank 40 used with the prior art Thomson coil actuator 30, the capacitor banks 116, 118 are kept fully charged. When the mechanical contacts 12 are closed and a fault condition is detected, the signal transmitted by the trip unit 10 to the operating mechanism 8 causes the capacitor banks 116, 118 to discharge simultaneously so that a time-varying current is supplied to each conductor 104, 105 via their respective first leads 111, 113, generating a magnetic field in each conductor 104, 105.

As can be seen by comparing FIG. 4 with FIG. 3, the disclosed improved coil 102 comprises the same number of turns as the prior art coil 34. However, when each conductor 104, 105 of the improved coil 102 is excited by half the capacitance that would excite the single conductor of the prior art coil 34, such that the capacitance of the first capacitor bank 116 and the capacitance of the second capacitor bank 118 are each one half the capacitance of the capacitor bank 40, the improved Thomson coil actuator 100 opens the movable mechanical contact 23 considerably faster than the prior art Thomson coil actuator 30 does, as detailed further hereinafter with respect to FIGS. 7-9 and Table 1. In other words, the disclosed improved Thomson coil actuator 100 uses the same total system energy to energize the improved coil 102 that the prior art Thomson coil actuator 30 uses to energize the prior art coil 34, but the improved actuator 100 actuates faster opening of the movable contact 23.

Figure 6:
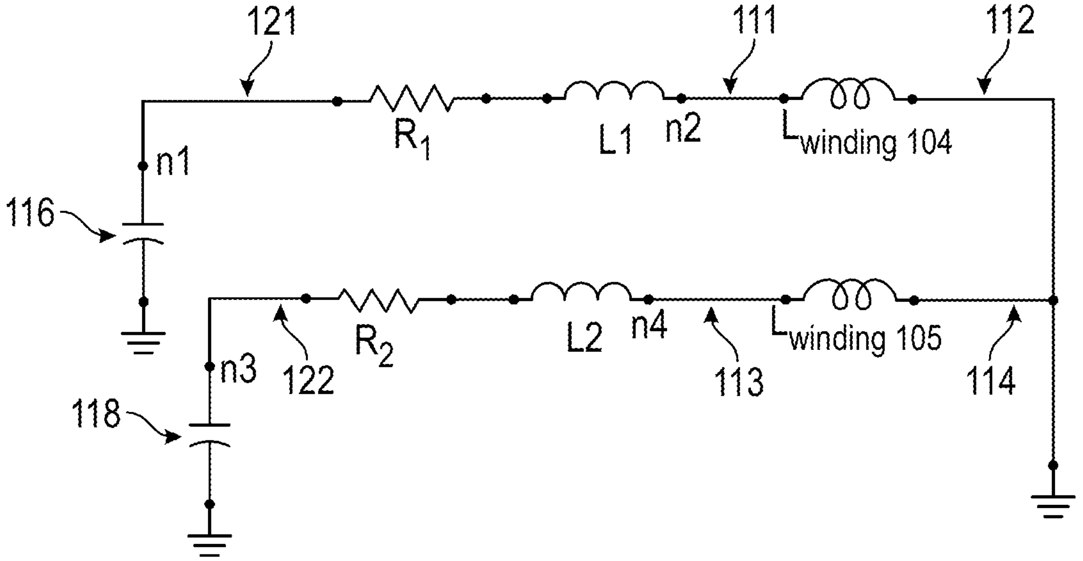
FIG. 6 is a circuit schematic representation used to perform finite element analysis (FEA) of the opening stroke performance of the dual conductor Thomson coil actuator shown in FIGS. 4-5B, in accordance with an example embodiment of the disclosed concept.

FIG. 6 is a circuit schematic representation of the improved Thomson coil actuator 100 that can be used to perform finite element analysis (FEA) for an opening stroke of the drive assembly 28 actuated by the Thomson coil actuator 100, in accordance with exemplary embodiments of the disclosed concept. For the FEA, as shown in FIG. 6, the conductor 104 is modeled as $L_{winding104}$ and the conductor 105 is modeled as $L_{winding105}$. A pair of cables 121 and 122 used to connect the capacitor banks 116 and 118 to the conductor leads 111 and 113 are modeled as well, particularly because connecting the conductors 104, 105 to the capacitor banks 116, 118 with the cables 121, 122 introduces resistances and inductances that act on the wound conductors 104, 105. FIG. 6 depicts these resistances and inductances as equivalent resistances R1 and R2 and inductances L1 and L2. Cable 121 is represented by the portion of the circuit schematic between node n1 and node n2, and cable 122 is represented by the portion of the circuit schematic between node n3 and node n4.

Table 1 below shows the results of the FEA wherein each modeled winding $L_{winding104}$ or $L_{winding105}$ of the dual conductor coil 102 is excited by its corresponding capacitor bank 116 or 118 with 3.3 mF at 700V, with an external resistance (R1, R2) of 5 mohm and an external inductance (L1, L2) of 1.25 uH. Table 1 also includes the results of an FEA for a modeled winding corresponding to the prior art single conductor coil 34 excited by the same total capacitance and voltage as the disclosed dual conductor coil 102, and with the same total number of turns as the dual conductor coil 102:

TABLE 1

| Input Parameters | Single Coil | Dual Coil |
|---|---|---|
| Turns | 8 | 4 + 4 |
| Capacitance (mF) | 6.6 | 3.3 + 3.3 |
| Voltage (V) | 700 | 700 |
| External Resistance (mohm) | 10 | 5 |
| External Inductance (uH) | 2.53 | 1.25 |
| **Output Parameters (opening stroke)** | **Single Coil** | **Dual Coil** |
| Peak Force (kN) | 44 | 58 |
| Force Rise Time (us) | 180 | 110 |
| Current Peak (kA) | 18 | 20.5, 20.8 |
| 1 mm Travel (us) | 350 | 320 |

Figure 7:
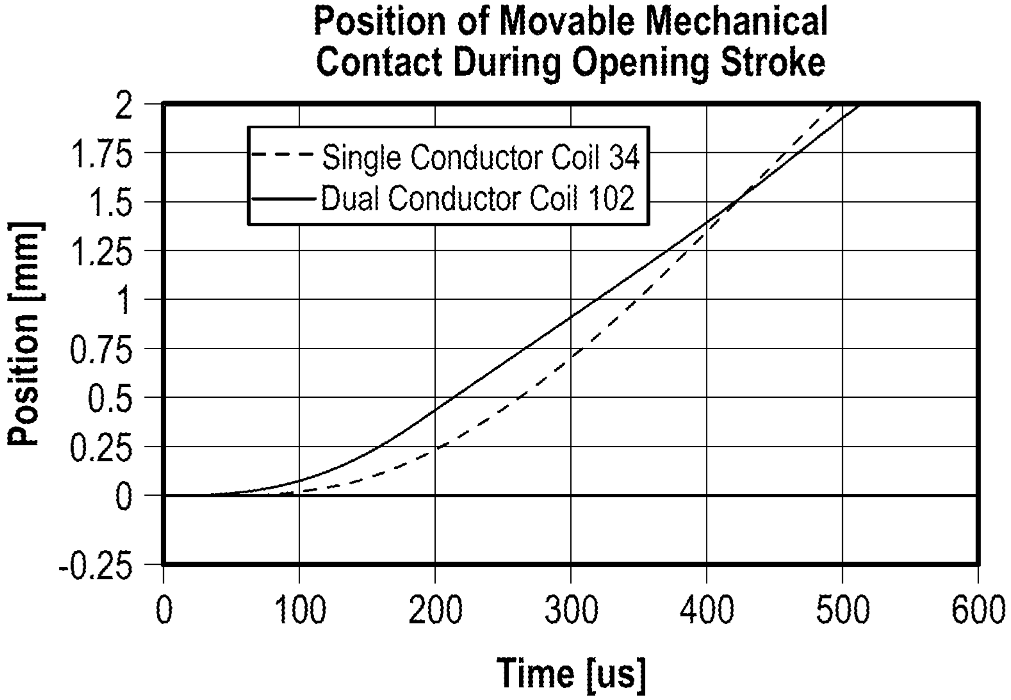
FIG. 7 is a graph of position vs. time curves generated during FEA for a movable mechanical separable contact that is actuated by the dual conductor actuator and for a movable mechanical separable contact that is actuated by the prior art actuator during an opening stroke.
Figure 8:
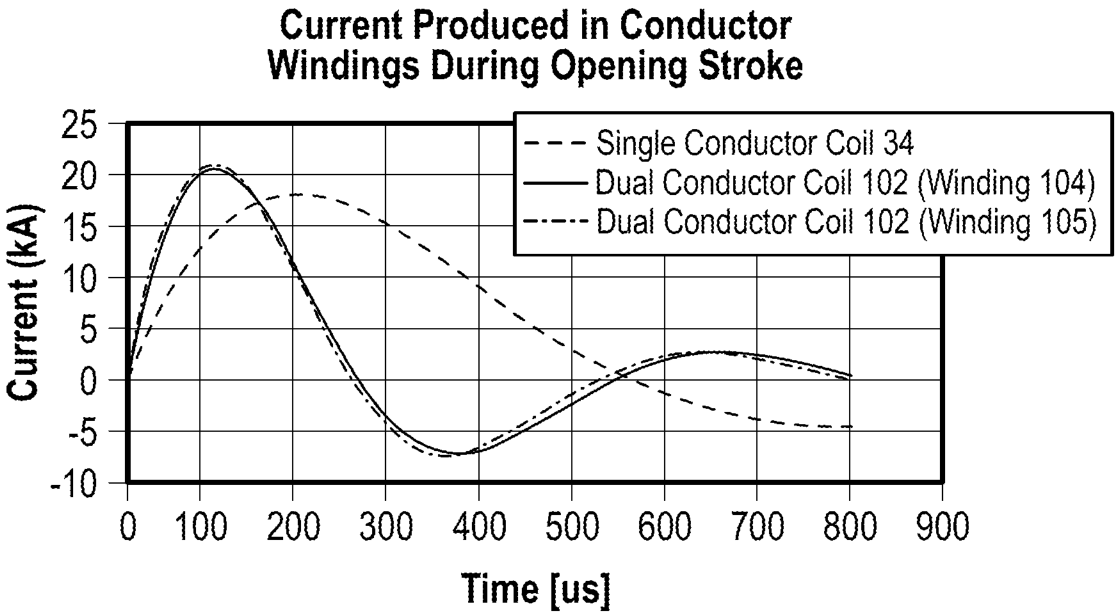
FIG. 8 is a graph of current vs. time curves generated during FEA of both the dual conductor actuator and prior art actuator during an opening stroke.
Figure 9:
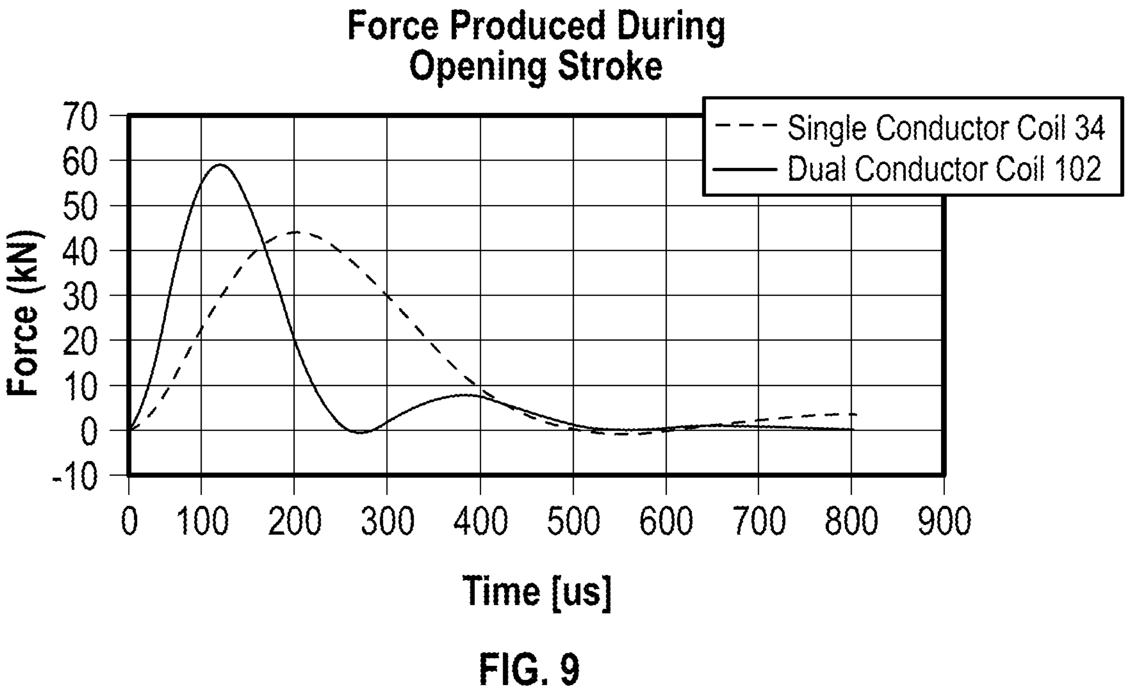
FIG. 9 is a graph of force vs. time curves generated during FEA of both the dual conductor actuator and prior art actuator during an opening stroke.

As shown in Table 1, when the disclosed dual conductor coil 102 is excited by the same total stored energy (6.6 mF at 700V) as the prior art single conductor coil 34, the dual conductor coil 102 outperforms the single conductor coil in the output parameters of peak force, force rise time, peak current, and time elapsed during the first 1 mm of travel of the movable mechanical contact 23 during an opening stroke. FIG. 7, FIG. 8, and FIG. 9 graphically depict the various output parameters shown in Table 1: position of the movable mechanical contact 23 over time during an opening stroke (FIG. 7), current produced in the windings of the coils 34 and 102 during an opening stroke (FIG. 8), and force produced by the coils 34 and 102 during an opening stroke (FIG. 9).

It is noted that maximizing the speed of the initial 0.1 mm of travel of the movable contact 23 is considered especially significant for reducing let-through current. As the position vs. time curves in FIG. 7 show, the improved dual conductor coil 102 opens the movable contact 23 to a distance of 0.1 mm approximately 80 us faster than the prior art single conductor coil 34. The current vs. time curves in FIG. 8 show that the dual conductor coil 102 reaches a greater total current than the single conductor coil 34, and that the dual conductor coil 102 has a faster current rise time, i.e. the dual conductor coil 102 reaches its peak current faster than the single conductor coil 34 does. The force vs. time curves in FIG. 9 depict the force generated by the coils 34 and 102 to repel the conductive plate 32. The area under each curve is denotes the total impulse for the corresponding coil 34 or 102. While the total impulse of the single conductor coil 34 over the duration of an opening stroke is larger than the total impulse of the dual conductor coil 102 over the duration of an opening stroke, the impulse of the dual conductor coil 102 is considerably higher than that of the single conductor coil 34 for first 200 us of the opening stroke, signifying that the disclosed Thomson coil actuator 100 develops a higher early velocity and faster initial opening distance than the prior art Thomson coil actuator 30 does. It is noted that connecting each conductor 104, 105 of the disclosed improved coil 102 to its own respective capacitor bank 116, 118 is necessary to realize the advantages of the improved coil 102, as experimental data shows that connecting the two conductors 104 and 105 in parallel and exciting them from a single capacitor bank does not exhibit much improvement over the prior art single conductor coil 34 during an opening stroke.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. An actuator for use with a circuit interrupter, the actuator comprising:
   a conductive plate structured to be coupled to a drive assembly of the circuit interrupter;
   a conductive coil, the coil comprising:
   a plurality of turns;
   a first conductor wound into a first number of turns;
   a second conductor wound into a second number of turns;
   a first power source electrically connected to the first conductor;
   a second power source electrically connected to the second conductor; and
   an opening structured to receive the drive assembly and to enable the drive assembly to move freely during an opening stroke,
   wherein the plurality of turns is the sum of the first number of turns and the second number of turns,
   wherein the first conductor and the second conductor are nested such that the first number of turns forms alternating turns of the coil relative to the second number of turns,
   wherein the first power source and the second power source are configured to simultaneously supply a first time-varying current signal and a second time-varying current signal, respectively, to the first conductor and the second conductor, and
   wherein the actuator is structured to cause the coil to repel the conductive plate when the first and second time-varying current signals are supplied to the first and second conductors.

2. The actuator of claim 1,
   wherein the second number of turns is equivalent to the first number of turns.

3. The actuator of claim 1,
   wherein the first power source is a first capacitor bank and the second power source is a second capacitor bank,
   wherein supplying the first time-varying current signal to the first conductor entails discharging the first capacitor bank from its charged state, and
   wherein supplying the second time-varying current signal to the second conductor entails discharging the second capacitor bank from its charged state.

4. The actuator of claim 1,
   wherein the actuator is configured to drive the drive assembly a distance of 0.1 millimeters in under 100 microseconds.

5. The actuator of claim 4,
   wherein the first number of turns is four and the second number of turns is four.

6. The actuator of claim 4,
wherein the first power source is a first capacitor bank and the second power source is a second capacitor bank,
wherein supplying the first time-varying current signal to the first conductor entails discharging the first capacitor bank from its charged state,
wherein supplying the second time-varying current signal to the second conductor entails discharging the second capacitor bank from its charged state,
wherein the charged state of the first capacitor bank is 3.3 millifarads at 700 volts, and
wherein the charged state of the second capacitor bank is 3.3 millifarads at 700 volts.

7. The actuator of claim 4,
wherein a peak force generated by the coil during an opening stroke is at least 58 kilonewtons.

8. The actuator of claim 7,
wherein a rise time of the peak force is 110 microseconds or under.

9. The actuator of claim 1,
wherein the actuator is configured to drive the drive assembly a distance of 1 millimeter in 320 microseconds or under.

10. A hybrid circuit interrupter, the hybrid circuit interrupter comprising:
a line conductor structured to connect a load to a power source;
a hybrid switch assembly disposed between the power source and the load, the hybrid switch assembly comprising:
a fixed mechanical separable contact and a movable mechanical separable contact, the movable mechanical separable contact being structured to move between a closed state and an open state; and
an electronic interrupter structured to commutate current when a fault is detected on the line conductor;
a drive assembly operably coupled to the movable mechanical separable contact;
an electronic trip unit structured to monitor the line conductor for fault conditions; and
an actuator structured to open and close the movable mechanical separable contact, the actuator comprising:
a conductive plate coupled to the drive assembly; and
a conductive coil, the coil comprising:
a plurality of turns;
a first conductor wound into a first number of turns;
a second conductor wound into a second number of turns;
a first power source electrically connected to the first conductor;
a second power source electrically connected to the second conductor; and
an opening structured to receive the drive assembly and to enable the drive assembly to move freely during an opening stroke,
wherein the plurality of turns is the sum of the first number of turns and the second number of turns,
wherein the first conductor and the second conductor are nested such that the first number of turns forms alternating turns of the coil relative to the second number of turns,
wherein the first power source and second power source are configured to simultaneously supply a first time-varying current signal and a second time-varying current signal, respectively, to the first conductor and the second conductor, and
wherein the actuator is structured to cause the coil to repel the conductive plate when the first and second time-varying current signals are supplied to the first and second conductors.

11. The circuit interrupter of claim 10,
wherein the second number of turns is equivalent to the first number of turns.

12. The circuit interrupter of claim 10,
wherein the first power source is a first capacitor bank and the second power source is a second capacitor bank,
wherein supplying the first time-varying current signal to the first conductor entails discharging the first capacitor bank from its charged state, and
wherein supplying the second time-varying current signal to the second conductor entails discharging the second capacitor bank from its charged state.

13. The circuit interrupter of claim 10,
wherein the actuator is configured to drive the drive assembly a distance of 0.1 millimeters in under 100 microseconds.

14. The circuit interrupter of claim 13,
wherein the first number of turns is four and the second number of turns is four.

15. The circuit interrupter of claim 13,
wherein the first power source is a first capacitor bank and the second power source is a second capacitor bank,
wherein supplying the first time-varying current signal to the first conductor entails discharging the first capacitor bank from its charged state,
wherein supplying the second time-varying current signal to the second conductor entails discharging the second capacitor bank from its charged state,
wherein the charged state of the first capacitor bank is 3.3 millifarads at 700 volts, and
wherein the charged state of the second capacitor bank is 3.3 millifarads at 700 volts.

16. The circuit interrupter of claim 13,
wherein a peak force generated by the coil during an opening stroke is at least 58 kilonewtons.

17. The circuit interrupter of claim 16,
wherein a rise time of the peak force is 110 microseconds or under.

18. The circuit interrupter of claim 10,
wherein the actuator is configured to drive the drive assembly a distance of 1 millimeter in 320 microseconds or under.

* * * * *